Figure 1:
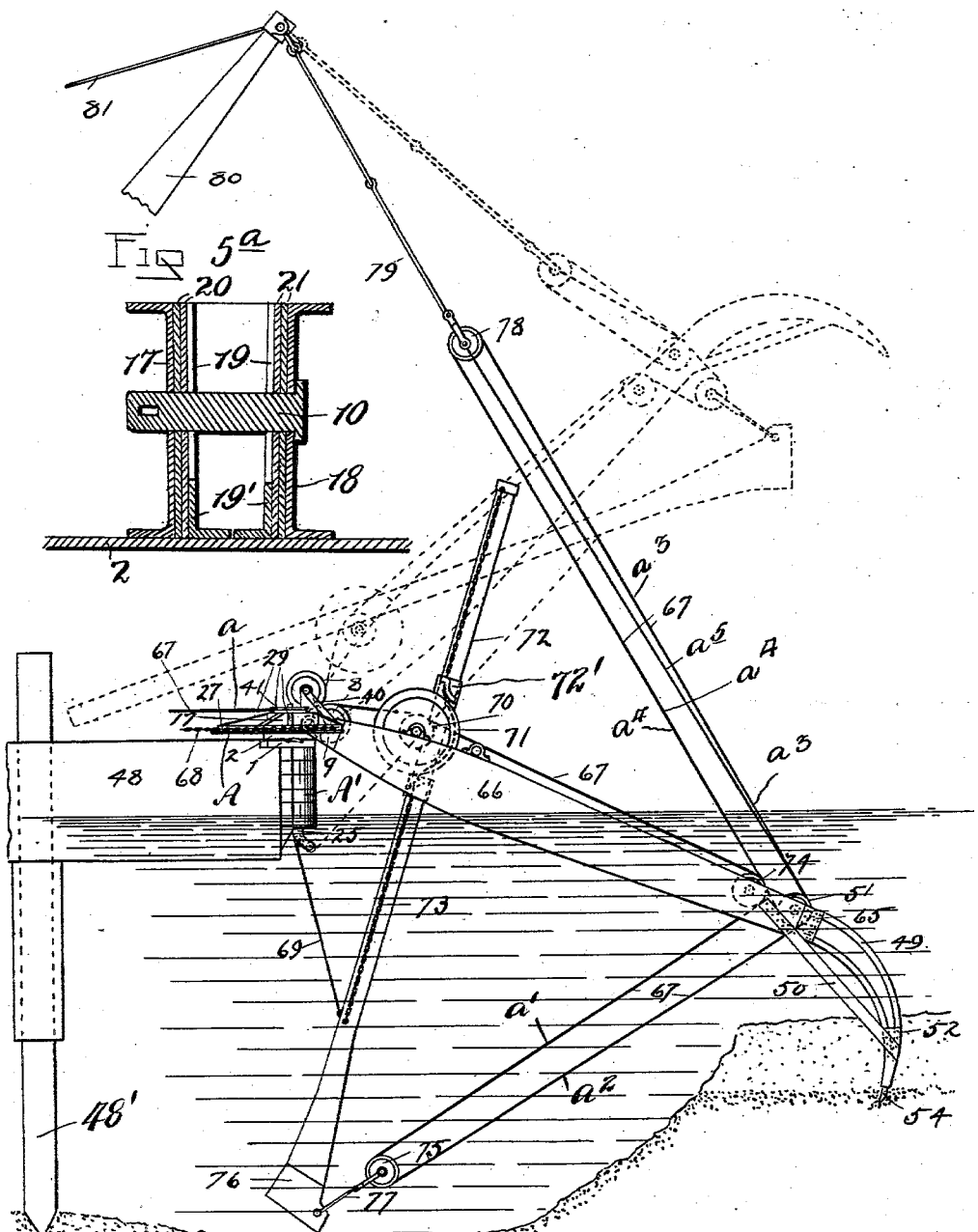

No. 751,937. PATENTED FEB. 9, 1904.
R. R. OSGOOD.
DREDGE.
APPLICATION FILED JULY 23, 1903.
NO MODEL. 6 SHEETS—SHEET 1.

WITNESSES
William A. Sweet
C. C. Hines.

INVENTOR
Ralph R. Osgood.
By H. B. Willson,
Attorney.

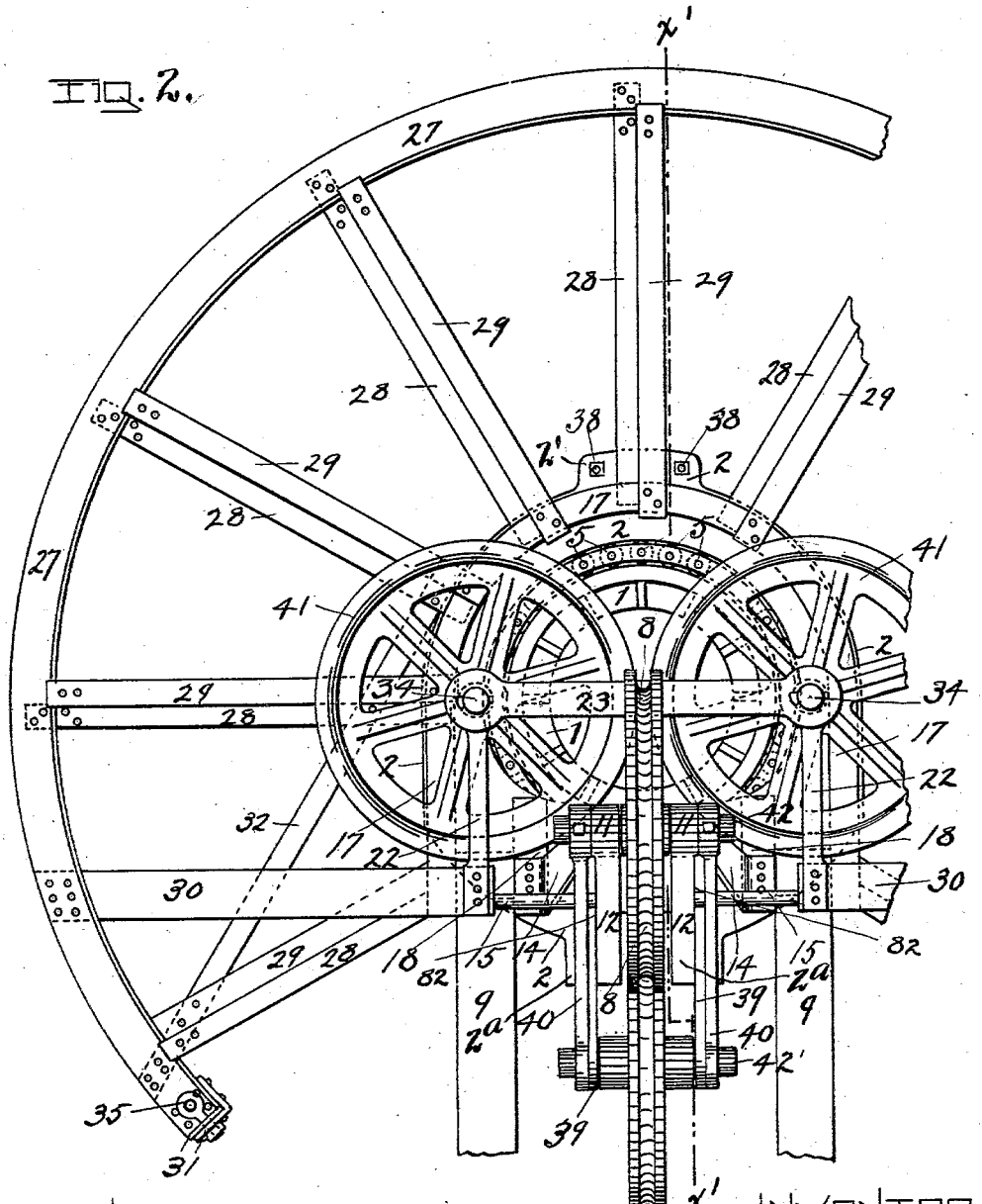

No. 751,937. PATENTED FEB. 9, 1904.
R. R. OSGOOD.
DREDGE.
APPLICATION FILED JULY 23, 1903.
NO MODEL. 6 SHEETS—SHEET 3.
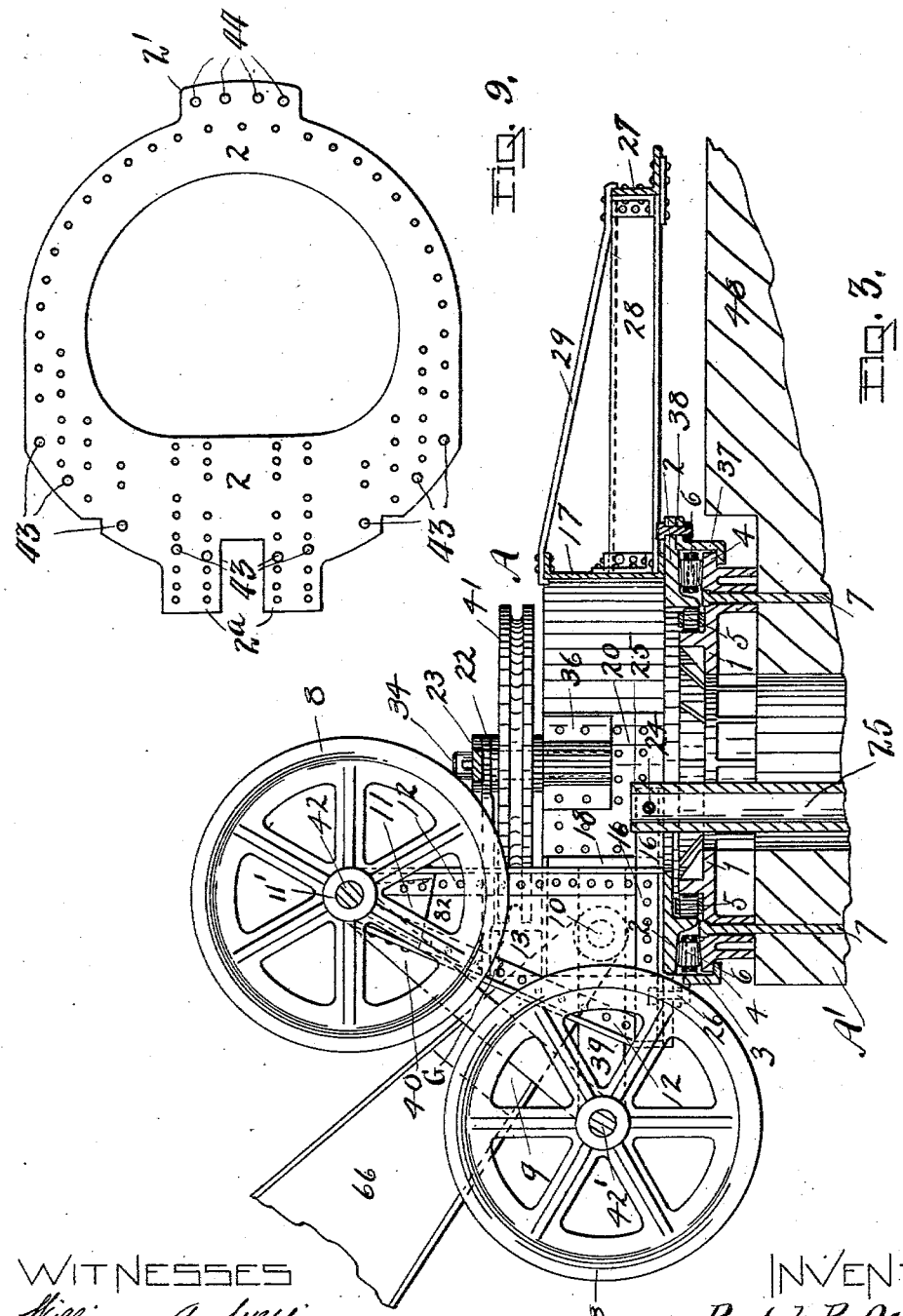
WITNESSES
William A. Sweet
C. C. Hines
INVENTOR
Ralph R. Osgood,
By H. B. Wilson,
Attorney.

No. 751,937. PATENTED FEB. 9, 1904.
R. R. OSGOOD.
DREDGE.
APPLICATION FILED JULY 23, 1903.
NO MODEL. 6 SHEETS—SHEET 4.
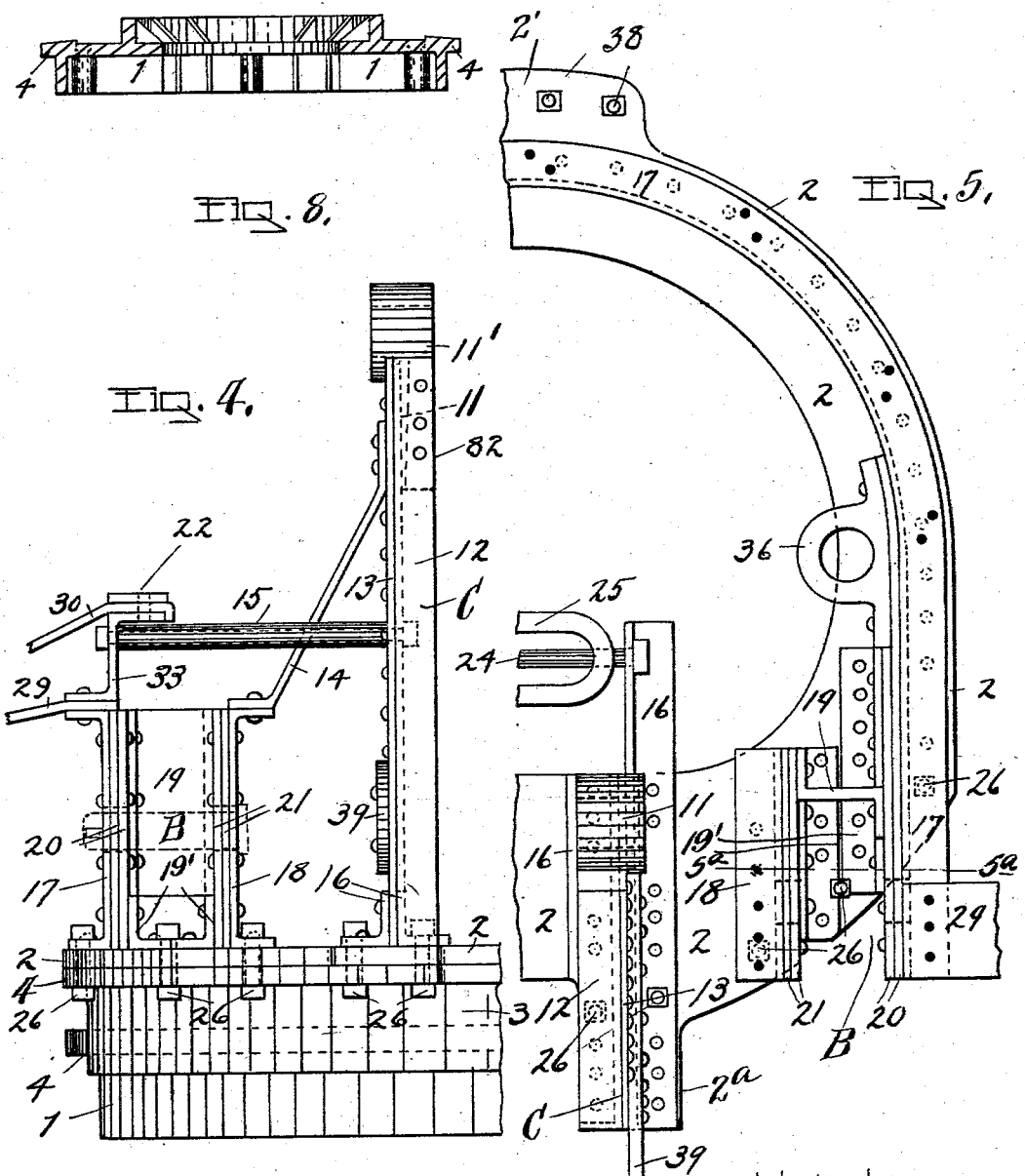
WITNESSES
William A. Swett
C. C. Hines.
INVENTOR
Ralph R. Osgood.
By 
Attorney.

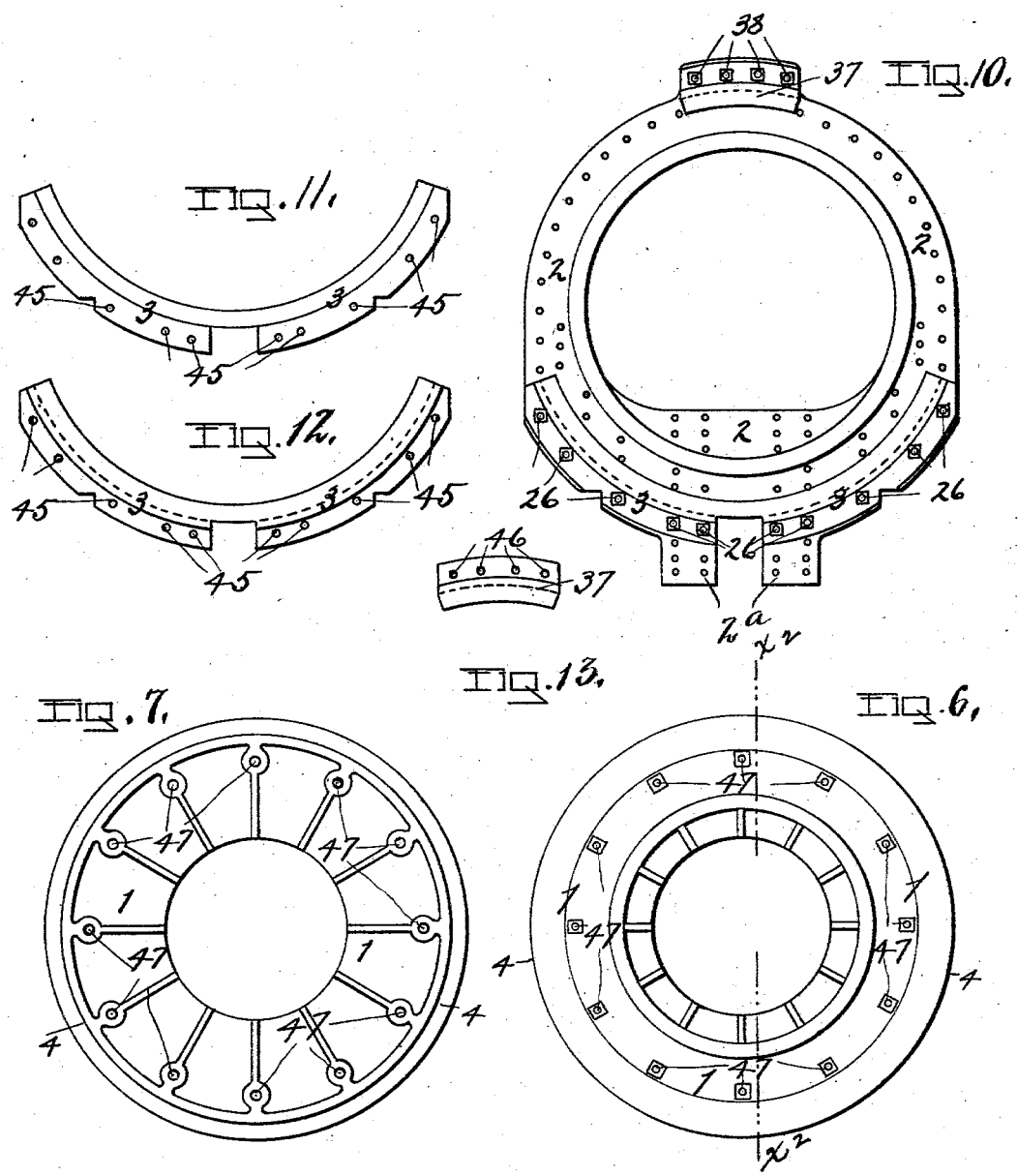

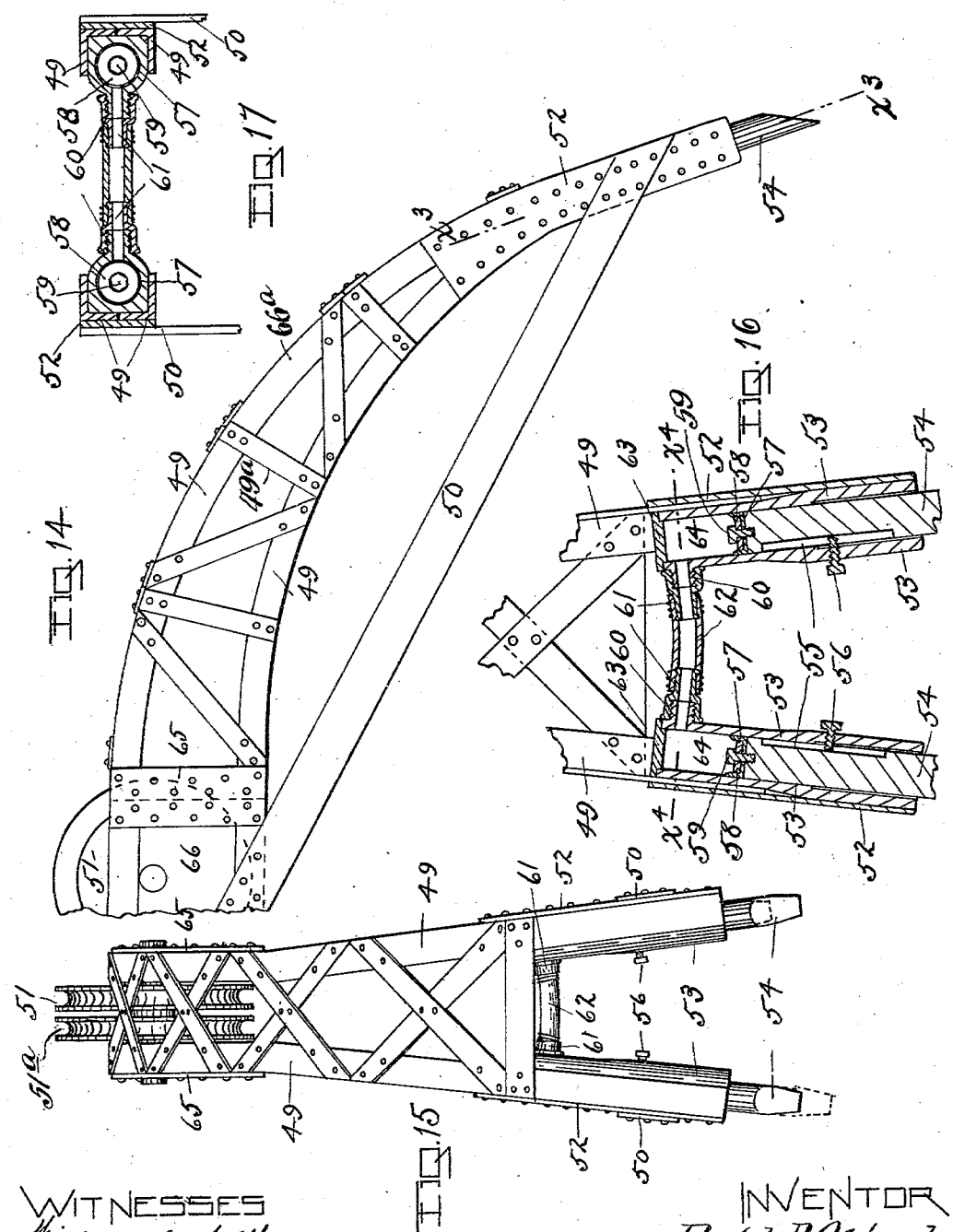

No. 751,937. Patented February 9, 1904.

UNITED STATES PATENT OFFICE.

RALPH R. OSGOOD, OF TROY, NEW YORK.

DREDGE.

SPECIFICATION forming part of Letters Patent No. 751,937, dated February 9, 1904.

Application filed July 23, 1903. Serial No. 166,738. (No model.)

*To all whom it may concern:*

Be it known that I, RALPH R. OSGOOD, a citizen of the United States, residing at Troy, in the county of Rensselaer and State of New York, have invented certain new and useful Improvements in Dredges; and I do declare the following to be a full, clear, and exact description of the invention, such as will enable others skilled in the art to which it appertains to make and use the same.

My invention relates to improvements in dredges or excavators of that class employed for excavating earth or other materials and comprising a suitable support, such as a boat or car, supplied with dredging mechanism having a scoop, dipper, or bucket mounted upon a controlling-handle and adapted to receive the load and deliver it at the point required.

One object of the invention is to provide a dredge of this character so constructed as to dredge "hard-pan" with the least possible strain on the various parts of the machine, to which end I provide an anchor upon the outer extremity of the boom, which extends forward and downward. When the boom and dipper are lowered, the anchor at the end of the boom is forced into the bank forward and downward out of the way of the movement of the dipper. The anchor, which preferably consists of a plurality of members, has its members spread apart to prevent the boom from canting, and said members are made to adjust themselves to an uneven surface by automatic hydraulic mechanism. The power applied to force the dipper into the bank is carried over the end of the boom and thrusts the anchor into the bank with a force corresponding to the force with which the dipper is forced into the bank to scoop up the material, the anchor thus serving to hold the boom securely in position and relieve the strain on the spuds and other parts of the machine. When the dipper is being forced into the bank, the pulling strain falls between the dipper and the anchor and gives the dipper a direct pull into the bank. On the elevation of the dipper to the point where the sheaves come block and block the boom and dipper are simultaneously drawn up to any required point to discharge the contents of the dipper. In accordance with my invention the anchor is mounted upon the usually constructed boom, so that when soft material is to be dredged it may be removed and the boom sustained in an elevated position for ordinary work. This upward-and-downward movement of the dipper and boom is disclosed in my prior patent, No. 362,587, dated May 10, 1887; but in the present invention the anchor is provided, which when the boom is lowered carries the point of the boom under the water. This construction requires the use upon the turn-table of two vertical sheaves for the lead of the hoisting chain or cable when the anchor is used.

Another object of the invention is to provide a turn-table which is simple of construction, may be manufactured at a comparatively low cost, and increases the strength and efficiency of the apparatus as well as the convenience and ease with which the general machine may be manipulated. This turn-table is composed of a built-up structure of angle metal and braces, and these parts are so combined as to yield maximum strength with lightness and ready facility for the application and removal of parts, so that it may be conveniently repaired when occasion requires. The parts of the turn-table are further constructed in such manner as to transmit the heavy strain to which it is subjected to the bed or foundation on which it rests, while taking up the downward pressure and lateral or side thrusts, so as to prevent crowding or binding of the turn-table against its track or way.

With these and other objects in view the invention consists of certain novel features of construction, combination, and arrangement of parts, as will be hereinafter more fully described, and particularly pointed out in the appended claims, reference being had to the accompanying drawings, in which—

Figure 1 is a side elevation of the front portion of a dredging-machine embodying my invention, the dotted lines indicating one position to which the dipper and boom may be elevated. Fig. 2 is a top plan view of the turn-table, a portion being broken away. Fig. 3 is a sectional view of the same on line $x'$ $x'$ of Fig. 2. Fig. 4 is an enlarged front view of one-half of the turn-table, showing the sheave-stand and associated parts. Fig. 5 is an enlarged top plan view of the opposite half of the same. Fig. $5^a$ is a cross-section through one of the pivot-sockets B, taken on line $5^a$ $5^a$ of Fig. 5. Fig. 6 is a top plan view of the "step" or trackway-section of the turn-table. Fig. 7 is a bottom plan view of the same. Fig. 8 is a cross-section thereof on line $x^2$ $x^2$ of Fig. 6. Fig. 9 is a top plan view of the bed-plate. Fig. 10 is a bottom plan view thereof, showing the segmental retaining-plates 3 and 37 applied thereto. Figs. 11 and 12 are respectively a top and a bottom plan view of plate 3. Fig. 13 is a bottom plan view of plate 37. Fig. 14 is an enlarged side elevation of the outer end of the boom and its anchoring extension. Fig. 15 is an end view of the same. Fig. 16 is a vertical transverse section through the anchor on line $x^3$ $x^3$ of Fig. 14, and Fig. 17 is a horizontal section on line $x^4$ $x^4$ of Fig. 16.

Referring now more particularly to the drawings, 48 denotes the boat or platform on which the machine is mounted and takes the place of any car or other support which may be desired to be used. This boat may be provided with one or more anchoring-spuds 48' to hold it stationary while a certain piece of dredging-work is being done.

66 denotes the boom upon which the dipper-handle is supported. This boom is hinged upon a turn-table A, mounted upon the platform 48, which turn-table is employed to swing the boom from side to side, so as to bring the dipper over any desired point either before receiving or before delivering its load.

76 denotes the dipper mounted upon the dipper-handle 72, which slides in the slideway-support 72', mounted to oscillate upon the boom, and is controlled by the friction brake-wheel 71 and brake-chain 73, by which it may be held stationary at any point in its arc of movement and adjusted in said slideway-support. The slideway-support and brake mechanism may be of the construction shown in my prior application for Letters Patent, filed June 25, 1903, Serial No. 163,087, or of the construction shown in any of my prior patents.

In order that the dipper may be drawn into the bank under advantageous application of the power, it is plain that the hoisting-chain should lead to the dipper from a point well forward of the same, and to so lead the hoisting-chain the boom is well lowered. Then after the load is received it is necessary to elevate the boom with the dipper in order to bring the dipper to the desired height to deliver its load into a scow or car or to discharge it at any elevation above the platform. To accomplish this elevation of the boom and dipper, I employ the hoisting-chain 67, which is also used for drawing the dipper into the bank, and thus by employing only the one chain I am enabled to place these movements within the easy control of one man.

A variety of ways of reeving the chain may be devised; but that shown is practicable and efficient and is preferred for this reason. The hoisting-chain now to be referred to is continuous from end to end, or is, in fact, but one chain, though for convenience of description I have designated the different portions or folds thereof by various reference characters. The portion $a$, leading from the main chain or hoisting-drum, (not shown,) is carried over the guide-sheave 70, thence over the guide-sheave 74 at the outer end of the boom, then leads down into the portion $a'$, around the sheave 75, attached by the connection 77 to the dipper 76, back in portion $a^2$, over sheave 51 near the end of the boom, up in portion $a^3$, over and around sheave 78, connected with the A-frame 80, down in the portion $a^4$, under sheave $51^a$, and back in portion $a^5$ and made fast at its extremity with the casing or frame of sheave 78 or at some other convenient point.

The sheave 78 is suspended from the A-frame 80 by means of a jointed rod or equivalent chain or cable, as 79. The A-frame is sustained by the usual guy-rod or connection 81. The chain being rove in the manner, or substantially in the manner, indicated and the boom being down and the dipper drawn back, as indicated in Fig. 1, in position to commence taking its load, the dipper is drawn into the bank by portions $a$, $a'$, and $a^2$, operating in a manner which will be readily understood, and the dipper thus loaded is made to continue its upward movement until the dipper or the sheave connected therewith comes block-a-block with the boom, when by further winding up or drawing upon the hoisting-chain the portions $a^3$, $a^4$, and $a^5$ are shortened and the boom and dipper raised together to the desired height, as indicated by the dotted lines in Fig. 1. In such movement of the boom the dipper-handle swings upon the slideway-support 72' and may reciprocate in said support under the complete control of the engineer or operator by a proper manipulation of the brake mechanism, as will be readily understood. When the boom and dipper are in the dotted-line position, (shown in Fig. 1,) the load may be dumped and the dipper and boom again lowered to their respective working positions. When the boom is in its lowermost position, it is desirable to provide some means for holding it stationary so as to prevent strain on the spuds and other parts of the dredge and permit a better and stronger action of the dipper in taking its load. To this end I provide the boom with a downwardly and forwardly curved extension $66^a$, terminating at its outer end in an anchor comprising spurs or penetrating devices 54. In the construction of the boom angle-iron corner-pieces 49 are preferably employed, and these are connected and braced by straight or diagonal bracing-pieces 49$^a$. At the point of junction of the curved extremity 66$^a$ of the boom with the end of the main part of the boom bridge-plates 65 are arranged and bolted or riveted to hold the parts connected, and a brace 50 also connects the outer end of the main part of the boom with the outer or free end of the curved end section 66$^a$. By the removal of these parts the end section 66$^a$ may be detached when the anchor is not required, as in excavating soft material, thus permitting the boom proper, 66 to be elevated to its usual position for ordinary work.

The spurs or penetrating devices 54, forming the anchor, form the outer ends of pistons which are movable longitudinally in cylinders 53, secured upon the outer ends of the boom-section 66$^a$. The outer ends of the angle-iron pieces 49 of said section 66$^a$ fit upon the outer side of the said cylinders 53, and reinforcing-plates 52 are disposed upon the outer sides of the ends of said pieces 49 and are bolted or riveted to the cylinders to securely connect the parts together. Each piston 54' has a longitudinal groove 55, receiving a set-screw 56 on the cylinder 53, and is provided at its inner end with a leather cup 57 and washer 58, retained in place by a screw or other suitable fastening 59. The two pistons 54' are longitudinally adjustable in the cylinders 53 and are held from rotary motion by the screw 56, while permitted to have a limited longitudinal motion. At the outer or upper ends of the two cylinders 53 is a water space or chamber 64, and extending from these chambers are threaded nipples 60, receiving coupling devices 61, by means of which a hose or like connection 62 is coupled thereto. Each chamber 64 is closed, as shown, by a removable head 63, which gives ready access to the upper end of each cylinder. The purpose of employing two anchoring-spurs spaced apart is to give a large holding area and prevent canting of the boom in operation, and the purpose of employing a sliding piston and cylinders is to make provision to adapt the anchor to inequalities of surface of the bank. It will be seen that if one spur should strike the bank in advance of the other the force of contact will cause said spur to recede within its cylinder, and by such action the water 64 in the chamber of said cylinder will be forced over into the chamber of the other cylinder, thereby projecting the other anchoring-spur. By this means the spurs will be automatically adjusted to suit inequalities of surface and secure a firm holding action under all conditions of service. It will also be observed that when the boom and dipper are lowered, as shown in Fig. 1, the anchor of the boom will engage the bank out of the path of the movement of the dipper, and the power applied to force the dipper into the bank is carried over the end of the boom and forces the anchor into the bank with the same degree of force as the force of movement of the dipper, the anchor staying the vessel during such operation, and thereby relieving the spuds 48' and other parts of the dredging mechanism from strain. As shown, the hoisting-chain 67 passes between vertical sheaves 8 and horizontal sheaves 41, located on the turn-table, by which it is guided in the vertical as well as the laterally-swinging movements of the boom.

69 denotes the backing chain or cable extending up through the well of the turn-table foundation A' and guided by the guide member 25, substantially as shown in my prior patent, No. 708,657, dated September 9, 1902.

The turn-table comprises a step or annular base-plate 1, secured by bolts 7 to the foundation A' and provided with track-surfaces for vertical and horizontal sets of antifriction-rollers 5 and 6, on which turns an annular bed-plate 2, forming the rotary member of the turn-table. At its rear this plate 2 is formed with an offset 2', having holes 44 for passage of bolts 38, connecting thereto a retaining plate or casting 37, which is flanged to project under a flange 4 on the step 1. At the front the plate 2 is formed with a pair of spaced offsets 2$^a$ and has openings 43 for passage of bolts 26, securing thereto a segmental retaining plate or casting 3, which is notched in line with the space between said offsets 2$^a$ and which is also flanged to take under the flange 4 of the step 1. The two plates 37 and 3 hold the bed-plate 2 in position, prevent it from canting, and also retain the horizontal series of rollers 6 in place.

24 denotes a bolt connecting the upper end of the guide member 25 to a movable part of the turn-table A.

Extending around the rear portion and sides of the bed-plate is a channel-iron brace 17, whose webs or flanges project outwardly and which is riveted by its lower flange to said bed-plate. Disposed outside and concentric with the iron 17 is a nearly circular angle-iron 27, designed to form a guide and track way for the swinging chains or cables (not shown) which swing the turn-table. The ends of this track-iron are reinforced by angle plates or pieces 31 to form strengthened supports for eyebolts 35, to which the ends of said chains or cables are attached. The said track-iron is supported from the bed-plate 2 by upper radial flat metal arms 29 and lower radial arms 28, the latter formed of Z-irons. Secured to the iron 17 are bearing-brackets 36 to receive the shafts 34 of the horizontal sheaves, as hereinafter described.

Formed at the front of the turn-table are the pivot recesses or sockets B for the reception of the pivot portions 9 of the boom 66. These are formed in the following manner: The end of the iron 17 projects beyond the bed-plate 2 and has bolted or riveted thereto reinforcing-plates 20. Opposite the bar 17 is an angle-iron plate 18, riveted to the bed-plate 2 and similarly reinforced by plates 21. The bar and plates 17, 18, 20, and 21 are pierced to receive the pivot-bolt 10, on which the coöperating part 9 of the boom is pivoted. A Z-brace 19 is disposed between the sides of the recess or socket thus formed and is riveted to said bar and plates, and angle-braces 19 are similarly secured to the plates and attached by the central row of bolts 26 to the parts 2 and 4. By this construction a strong and durable pivot connection is provided.

The sheave-supporting stands or brackets C are of substantially triangular form and are composed of angle-iron pieces 12, bolted to the bed-plate 2 and to which are riveted plates 13, similarly bolted to the bed-plate. Riveted to the angle-iron pieces and plates 13 are plates or castings 11, carrying the bearings 11' for the shafts 42 of the upper vertical sheave 8. Extending from the plates 12 and shaft 42 of the said upper vertical sheave are braces 39 and 40, whose outer ends converge and form bearings for the shaft 42' of the lower sheave 8. Angle-irons 16 brace the stands at their lower ends and extend back to receive the bolt 24, carrying the backing-chain guide 25. Bolts 15 extend from the stands and connect the same with Z-pieces 33, riveted to adjacent braces 29 and other webs of bar 17, which Z-pieces are in turn riveted to adjacent braces extending to the rail-iron 27 and to brace-bars 22. The brace-bars 22 project rearward and at their rear ends are connected by a cross-bar 23, the connecting ends of said bars 22 23 forming sockets to receive the upper ends of the shafts 34 of the horizontal sheaves 41, which are fitted at their lower ends in the sockets 36. Braces 14 connect the plates 18 with the sheave-stands, as clearly shown in Fig. 4. Thus it will be seen that all the parts are mutually braced and reinforced, providing an exceedingly strong and durable structure.

It will be observed that the sheave-stands extend out over and are secured to the offsets 2ᵃ, thus increasing their supporting-surface and forming an extended recess for movement of the lower portion of the upper rear vertical pulley 8.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

1. In a dredge or excavator, a hinged boom, a dipper sustained thereon upon a handle arranged to travel back and forth within the bearings on the boom, a hoisting-chain connected with said dipper below the boom and extending above the boom, for operation substantially as described, and a bank-engaging anchor upon the extremity of the boom.

2. In a dredge or excavator, a boom provided with an anchor.

3. In a dredge or excavator, a boom provided with an anchor to engage the bank in advance of the plane of movement of the dipper.

4. In a dredge or excavator, a boom provided with a downturned end terminating in an anchor.

5. In a dredge or excavator, a dipper, a boom provided with an anchor to engage the bank in advance of the dipper, and means for preliminarily operating the dipper to take its load and then releasing the boom and moving the dipper and boom together to discharge the load, substantially as described.

6. In a dredge or excavator, a boom provided with a removable anchor.

7. In a dredge or excavator, a boom provided with spaced bank-engaging anchoring devices.

8. In a dredge or excavator, a boom comprising movable spaced anchors, and compensating adjusting means for the anchors adapting them to automatically adjust themselves to irregularities in the bank, substantially as described.

9. In a dredge or excavator, a boom provided with an anchor at its outer end, comprising hydraulic cylinders, pistons in said cylinders provided with anchoring means, and connections for the passage of fluid from one cylinder to the other, substantially as described.

10. In a dredge or excavator, a turn-table having an angle-iron guide for the swinging chain or cable, and arms supporting said guide from the turn-table, substantially as described.

11. A dredge or excavator having a boom-pivoting member formed of elements of angle-iron, substantially as described.

12. A dredge or excavator having a boom-pivoting member formed of elements of angle-iron, a sheave-stand similarly formed, and a bracing connection between the said pivoting member and stand, substantially as described.

13. A dredge having a turn-table provided with an angle-iron rim, angle-iron members inside the rim, and braces between the rim and angle-iron members forming pivoting-sockets for the boom, substantially as described.

14. A dredge or excavator having a turn-table provided with sheave-stands built up of angle-iron, substantially as described.

15. A dredge turn-table having inwardlyprojecting members, a bolt or like connection connected to said members, and a backing-chain guide connected to the bolt.

16. A dredge turn-table having a bed-plate, an angle-iron extending partially around said plate, a plate secured to the angle-iron, and a second plate secured to the bed-plate and forming with the aforesaid plate a pivot-socket for the boom, substantially as described.

17. A dredge turn-table having a bed-plate, an angle-iron extending partially around said plate, a plate secured to the angle-iron, a second plate secured to the bed-plate and forming with the aforesaid plate a pivot-socket for the boom, and a Z-brace between said plates and forming the rear wall of said socket, substantially as described.

18. A dredge turn-table having a bed-plate, an angle-iron extending partially around said plate, a plate secured to the angle-iron, a second plate secured to the bed-plate and forming with the aforesaid plate a pivot-socket for the boom, a Z-brace between said plates and forming the rear wall of said socket, and knee-braces connecting the plates to the bed-plate, substantially as described.

19. A dredge turn-table having boom-pivot members and sheave-stands formed of angle metal, and braces between the pivot members and sheave-stands, substantially as described.

20. In a dredge turn-table, the combination with a rotary bed-plate, of an angle-iron disposed outside the same and forming a guide for the turn-table-swinging cables, a second angle-iron secured to the bed-plate, and radial arms between said angle-irons, substantially as described.

21. In a dredge turn-table, the combination with a rotary bed-plate, of an angle-iron disposed outside the same and forming a guide for the turn-table-swinging cables, a second angle-iron secured to the bed-plate, upper bracing-arms connecting the angle-irons, and lower Z-braces connecting the angle-irons, substantially as described.

22. In a dredge turn-table, the combination with a rotary bed-plate, of an angle-iron secured thereto, a second angle-iron disposed beyond and concentric with the bed-plate and aforesaid angle-iron, radial arms connecting the angle-irons, sheave-stands mounted on the bed-plate, pivot members for the boom also mounted on the bed-plate, braces between the sheave-stands and pivot members, and braces between the pivot members and outer angle-iron, the latter forming a guide for the chains or cable for swinging the turn-table.

23. In a dredge turn-table, the combination with a bed-plate, of a sheave-stand formed of angle-iron, a pivot-socket formed of angle-iron, tie-bolts between the outer side of each socket and the sheave-stand, and a brace between the inner side of each socket and the sheave-stand, substantially as described.

24. In a dredge turn-table, the combination with a rotary bed-plate, of an angle-iron disposed outside of and concentric with said bed-plate and forming a guide for the swinging cables, a second angle-iron mounted upon the bed-plate, radial braces between said angle-irons, sheave-stands mounted upon the bed-plate and composed of angle-irons, boom-pivot sockets also mounted upon the bed-plate and composed of angle-irons, one side of each socket being connected by one of the aforesaid radial arms to the outer angle-iron, Z-braces mounted upon the outer sides of the sockets and connected to the outer angle-iron, bolts between said Z-braces and sheave-stands, and braces between the inner sides of the sockets and the sheave-stands, substantially as described.

25. In a dredge turn-table, the combination with a rotary bed-plate, of angle-iron sheave-stands, an inner angle-iron partially surrounding the turn-table, an outer angle-iron connected by radial arms to said inner angle-iron, a horizontal shaft mounted in the sheave-stands, a sheave upon said shaft, a second horizontal sheave-shaft, arms projecting from the first-named sheave-shaft and supporting the second-named sheave-shaft, a sheave upon the second sheave-shaft, vertical sheave-shafts carrying horizontal sheaves and mounted at their lower ends in said nearly circular angle-iron, and a superposed frame forming a support for the upper ends of said vertical shafts, said frames being tied and braced to the sheave-stands and to the outer angle-iron.

26. In a dredge, a turn-table comprising a step having an overhanging lip or flange, a rotary member, and a retaining element carried by said rotary member and projecting beneath said lip or flange, and connecting the rotary member to the step, substantially as described.

In testimony whereof I have hereunto set my hand in presence of two subscribing witnesses.

RALPH R. OSGOOD.

Witnesses:
  C. M. PEASE,
  W. B. THAYER.